United States Patent Office 3,501,501
Patented Mar. 17, 1970

---

3,501,501
EXTRACTION OF MALTOL
Daniel N. Heintz, Bridgeton, Mo., Charles W. Roos, Belleville, Ill., and William S. Knowles, St. Louis, Mo., assignors to Monsanto Company, St. Louis, Mo., a corporation of Delaware
No Drawing. Continuation-in-part of application Ser. No. 547,418, May 4, 1966. This application Feb. 14, 1969, Ser. No. 799,532
Int. Cl. C07d 7/16
U.S. Cl. 260—345.9          19 Claims

ABSTRACT OF THE DISCLOSURE

A process wherein maltol is obtained from the maltol-containing bark of certain trees.

---

This is a continuation-in-part of application Ser. No. 547,418, filed May 4, 1966, now abandoned.

This invention relates to a process for obtaining maltol, a valuable flavor enhancer for foods and an aroma enhancer for perfumes and colognes. More particularly, this invention is concerned with a process whereby maltol is obtained from the maltol-containing bark of certain trees.

It is known that maltol can be obtained in very small amounts from the destructive distillation products of wood, and by partially synthetic processes from kojic acid obtained from fermentation media. However, maltol, obtained therefrom is still quite expensive. Economical methods for obtaining maltol are still being sought by those in the art.

Maltol has been reported to be in bark of some species of larch trees. We have found that maltol is present in larch bark in combined form to an extent varying from about 0.1 percent to about 2 percent by weight depending upon the bark layer and the season of harvest. The richest supply of maltol is found in the bark of roots of the larch trees although, for practical reasons, not much root bark is harvested. Large quantities of larch trees and bark containing maltol exist and are available, primarily in the northwest part of the United States and southwest Canada. The bark is available at sawmills where it is stripped off of larch trees and stored in a pile, there to be burned for fuel or otherwise used if economical processes for recovering useful components therefrom can be found.

Because of the remoteness of most of the sawmills where any substantial quantities of the bark would usually be found, and the quite small amount of maltol which is to be isolated from this bark, any practical process to extract maltol therefrom has to be inexpensive, involve in its use a minimum of chemical handling equipment and chemicals, and still avoid the production of large volumes of soluble waste with a significant biological oxidation demand (BOD).

Maltol is not easily extracted from tree bark. It is believed to be present in the bary as a glycoside derivative. Water extraction of the bark is not effective for extracting maltol economically because it does not extract more than about 25 percent of the available maltol in the bark. Chloroform extraction of maltol from the bark is not effective by itself and, even with a pre-treatment of the bark to free the maltol, involves the use of huge amounts of chloroform. Some of this chloroform is retained on the chloroform-wet bark waste product, and the process is expensive and unacceptable. It is estimated that the use of chloroform to extract maltol from the bark on a large plant scale would result in the loss of at least about 5 to 10 pounds of chloroform for each pound of maltol extracted.

Attempts have been made to spring maltol free from the bark by passing hot air or nitrogen through the finely divided bark, but this has resulted in the recovery of a maximum of only about 50 percent of the total maltol present in the bark. Superheated steam has also been used in attempts to free the maltol from the bark. A maximum of 71 percent of the available maltol was freed using this procedure at a steam temperature of 125°–130° C. However, for every gram of maltol freed by this method, upwards of 30,000 liters of steam would have to be passed through the bark. It is apparent from these efforts that the bark has a strong affinity for maltol, even in the presence of maltol solvents such as water and chloroform. Those in the art are still looking for economical and effective methods to free and extract maltol from maltol-containing wood substances, such as bark.

It is an object of this invention, therefore, to provide those in the wood treating art with a practical, inexpensive method or process for extracting maltol from maltol-containing tree bark.

It is a more specific object of this invention to provide a cyclic integrated process for extracting maltol from maltol-containing tree bark using materials readily available to the lumberman and with only a minimum of organic solvent extractants.

Other objects, aspects and advantages of this invention will become apparent from reading the description and claims which follow.

Briefly, this invention provides a process for extracting maltol from maltol-containing tree bark which involves, (a) contacting the maltol-containing tree bark with an aqueous tannin liquor obtained from previous bark extractions to form a maltol-containing aqueous tannin liquor, and (b) recovering the maltol from the maltol-containing aqueous tannin liquor. This invention also provides the discovery that the maltol in the bark can be sprung free or made more readily extractable by the aqueous tannin liquor by treating the bark in a pretraction step.

This invention also provides a method of increasing the maltol recovery by pressing the bark which is saturated with the aqueous tannin liquor and retaining the liquor obtained therefrom.

Any tree bark which contains available maltol can be treated accordingly to this invention. Leaves and needles from trees which contain maltol may also be processed in accordance with this invention within the contemplated scope of the term "bark." The preferred tree bark to use is the bark of larch trees such as *Pinus larix* L *and larix occidentalis*. Other useful species containing maltol in the bark or leaves include for example, *Larix decidua, Larix sibericus, Larix laricina* (Tamerek), *Larex leptolepis, Larix lyallii, Abies mariesii, Abies vetchii, Tsuga diversifolia, Abies alba mill*. The bark can be that off the trunk of the tree or off the root of the tree. The root bark actually contains more available maltol but, of course, is more difficult to harvest. Either the outer bark or the inner most bark can be used, although the inner bark generally contains more maltol. For example, whereas random sampling of larch bark has indicated the presence of about 0.19 percent to about 0.35 percent of maltol, the inner bark from the trunk section has contained from about 0.82 percent to 1.27 percent maltol. Maltol content in root bark has varied from 1.37 to 2.60 percent maltol in the samples tested.

In preparation for treatment of the bark in accordance with this invention, the bark is preferably finely divided as by chipping, grinding, etc. by conventional methods to any desired size, e.g., to a size sufficient to be retained by a 60 mesh screen but which passes through an 8 mesh screen, to permit good liquid contact therewith.

It has been found that the maltol in the bark can be "sprung free" from any chemical combination in the bark, or at least made more readily extractable, by treating the bark as hereinafter described prior to extraction. For purposes of brevity, the treatment will herein be referred to as a "pre-extraction" step. As mentioned hereinabove the maltol in maltol-containing tree bark has been recovered in the prior art only with difficulty. This may well be due to its being chemically combined in the form of a glycoside derivative, or due to other unknown reasons. However, a common problem in the prior art extraction processes is the low level of maltol recovered from the bark. It has been found that the maltol may be extracted to a much higher level by utilizing the pre-extraction step of contacting the bark with water and allowing the wet bark to set for several days prior to contacting the bark with the aqueous tannin liquor to extract the maltol therefrom. The enhanced maltol extraction allowed by this pre-extraction step may be caused by a fermentation within the wet bark due to the enzymes contained within the bark, or it may be due to other factors, but it is a fact that the extraction of maltol is substantially enhanced by utilizing this pre-extraction step. It has been found that this pre-extraction step may be readily conducted at a sawmill site. The bark is preferably piled in the atmosphere, after being finely divided and wetted with water, or wetted prior to being piled up, and allowed to set for several days, usually at least about 3 days. No particular equipment is necessary for this pre-extraction step. If desired, the wetted bark particles may be stored in sealed containers in a wetted condition, but this is not necessary since, even if the surfaces of a pile of wetted bark dry out in the atmosphere, the interior remains wet. With the pre-extraction step the extraction with the aqueous tannin liquor provides a significant increase in the percent of maltol obtained from the bark.

Another pre-extraction step to make the maltol in maltol-containing tree bark more readily extractable is to contact the bark with an aqueous mineral acid solution, which contains from about 1 to about 5% by weight of the acid, and subsequently allowing the bark to set for several days. This pre-extraction step may be used as an alternate to the pre-extraction step utilizing water alone. However, the use of water is preferred due to lower costs and the absence of corrosion or pollution problems. The acid pre-extraction step may not be used in conjunction with the water pre-extraction step as it has been found that maltol recovery is not improved thereby.

In a typical example of the process of this invention, the first batch of finely divided, pre-extraction treated bark is contacted with water to form a liquor containing both tannins and maltol extracted from the bark. After separating the resulting maltol-containing aqueous tannin liquor from the bark particles, the liquor is contacted with chloroform or another suitable solvent for maltol, which is not a substantial solvent for the tannins, to extract the maltol. The maltol-containing chloroform is then separated from the aqueous tannin liquor. The resulting aqueous tannin liquor is then returned for reuse in further bark extractions. The tannin concentration of the aqueous tannin liquor increases until an equilibrium is reached in the system. If all the tannins were recycled the concentration of the tannins would reach saturation level, e.g., at from about 20 to about 25 percent by weight of the liquor. Actually, in each cycle there is a volume loss due to the wetting of the maltol-depleted bark with the tannin liquor. This loss is made up by adding the more concentrated aqueous tannin liquor obtained by squeezing or otherwise pressing liquid out of the wet spent bark. The equilibrium value of tannin concentration is considerably short of saturation because make-up water is usually added to keep the volume of the tannin liquor constant. Since, for this invention, it is desirable to keep the tannin concentration as high as possible, and preferably from about 2 to about 20% by weight of the liquor, the make-up water used could be displacement wash water passed over spent bark to remove adherent tannin liquor.

An additional feature of the present invention is the use of a mineral acid such as sulfuric, hydrochloric, nitric or phosphoric, in the aqueous tannin liquor to enhance the maltol extraction. The acid may be utilized in amounts, say from about 1 to about 5% by weight of the liquor. The acid may be utilized with or without the bark pre-extraction step.

The extraction of maltol from mark can be conducted as a batch operation or in a continuous operation. In a continuous operation a bank of several vessels containing bark can be operated alternately to provide continuously a maltol-containing aqueous tannin liquor to a continuous maltol solvent extraction system. For example, while one vessel is being emptied of spent bark and refilled with maltol-containing bark, the aqueous tannin liquor can be circulated through a second and third vessel containing fresh maltol-containing bark to extract the maltol therefrom. The extraction may also be conducted by a counter-current or semi-counter current process.

As noted above, a more concentrated aqueous tannin liquor can be obtained by squeezing or otherwise pressing liquid out of the wet spent bark. It has been found that this method may be used not only in conjunction with the extraction method but may be used in lieu of it, by saturating the bark with the aqueous tannin liquor and pressing the saturated bark to recover a concentrated maltol-containing aqueous tannin liquor. The term "saturating the bark" means contacting the bark with an amount of aqueous tannin liquor, from which substantially all of the maltol has been removed in a previous cycle, to provide a mixture that is bark in intimate contact with aqueous tannin liquor and preferably contains from about 50 to 80% by weight of aqueous tannin liquor. The bark can be intimately mixed with the aqueous tannin liquor to provide thoroughly saturated particles. The bark can be prepared in a pre-extraction step or not, as desired, but preferably the former. In the event that a pre-extraction step is not utilized, the maltol in the resulting tannin liquor may not be in a free state but fermentation of the liquor obtained in this manner will liberate the maltol in preparation for the chloroform extraction. The removal of maltol by pressing a mixture of bark saturated with aqueous tannin liquor may be conducted in a single batch in which the bark is treated by only one saturation, pressed and discarded or it may be re-saturated, and re-pressed in several subsequent stages and then discarded according to the economics of the process. Likewise, the aqueous tannin liquor may be used in several stages such as in a counter-current process with the bark or may be used for saturation and pressing only once before extracting the maltol therefrom. The saturated bark should be pressed so as to reduce the amount of aqueous tannin liquor in the resulting mass to as low a level as possible and is generally reduced to an amount of from about 5 to 45% by weight. Any machine that can be used to subject the bark to a pressing and/or squeezing action will suffice.

It is to be understood that the process of this invention can be adapted to incorporate both a contacting of the bark with an aqueous tannin liquor to extract the maltol and a pressing of the saturated bark upon separating it from the aqueous tannin liquor. This can be done in a single stage batch operation or can be continuous or semi-continuous. For instance, a preferred process for obtaining excellent yields of maltol from larch bark comprises contacting the bark with an aqueous tannin liquor to extract maltol, separating the saturated bark from the resulting mass and pressing the saturated bark to obtain a concentrated aqueous tannin liquor which is added to the aqueous tannin liquor resulting from the original contact with the bark. The resulting aqueous tannin liquor contains a relatively high concentration of maltol, which can then be extracted by an organic solvent for maltol, such as chloroform, with the maltol being subsequently recovered from the organic solvent by known processes.

The extractions, pressings or combinations thereof of the pre-extraction treated bark with the aqueous tannin liquor can be accomplished at atmospheric or elevated pressures and at temperatures ranging from ambient temperatures to reflux temperatures. However, temperatures of from about 70 to 80° C. are preferred since at lower temperatures the extraction rate is slow. At higher temperatures the liquor will boil and complicate the chloroform extraction. So it is preferred to merely recycle the aqueous tannin liquor over the bark at temperatures of from about 70°–80° C. until analysis of samples of the liquor indicate that a satisfactory amount of the maltol has been extracted into the liquor from the bark. The time of contact will depend upon the bark particle size, the type of apparatus employed, the temperature and the percent of maltol extraction desired. A major proportion of the available maltol usually can be extracted with a recirculating aqueous tannin liquor which floods the bark in the containing vessel for from 2 to 10 hours, although for some batches it may be desired to run the extraction operation for 24 hours or more.

The aqueous tannin liquor used herein to extract maltol from the maltol-containing tree bark is an aqueous solution, colloidal suspension or aqueous dispersion of organic substances in the bark of maltol-containing trees which are extractable with water or water containing small amounts of mineral acid, either in a batch or cyclic process, at temperatures up to reflux temperatures of water-bark mixtures. The extraction may be accompanied by the further step of compressing or squeezing bark from the extraction step and adding the resulting liquor recovered therefrom to the aqueous tannin liquor to form an integral part of the aforementioned aqueous tannin liquor. With the use of less water the aqueous tannin liquor may be that afforded by saturating the bark and pressing it to recover a concentrated aqueous tannin liquor. The term "tannin" as used herein thus may include true tannin, semi-tannin or other materials so extracted and/or pressed from tree bark.

The extraction system used to extract the maltol from the maltol-containing aqueous tannin liquor may be a simple mixing vessel in which the extracting solvent such as chloroform is mixed with the aqueous tannin liquor, and then separated from the aqueous tannin liquor raffinate. In a large operation, however, we prefer that the maltol-containing aqueous tannin liquor be pumped into a liquid-liquid extraction apparatus, such as a countercurrent liquid-liquid column in which the extracting solvent, such as chloroform, flows in a direction opposite to the direction of the aqueous tannin liquor. The extraction vessel may be, e.g., a simple packed column, a rotating disc column or a Scheibel column to which extraction vessel is connected a solvent boiler vessel from which to receive solvent at the top or midsection of the extraction vessel. The extracting solvent containing maltol may be recycled from the bottom of the extracting vessel to the top thereof without reboiling the solvent, until the extracting solvent is sufficiently concentrated with maltol from the aqueous tannin liquor, at which time the maltol-containing solvent can be removed to the solvent boiler to concentrate the maltol-containing solvent to the desired weight percent by distilling off and recirculating the solvent to the extraction column or to a holding vessel. The concentrated maltol-containing solvent, containing say up to 25% or more of maltol therein may be immediately further purified or crystallized from the solvent by known methods, or be trucked in this form to a purification plant where the maltol can be purified more economically on a large scale. The preferred method of purifying the crude maltol is to mix it with ethylene glycol or similar material, distill the maltol with the ethylene glycol from the crude mixture. Upon cooling, the higher melting maltol settles out of the ethylene glycol. Alternatively, the maltol may be purified by crystallizing the maltol from water or alcohol in which it is soluble, or by subliming the maltol in a suitable apparatus.

The invention is further illustrated by the following detailed examples.

EXAMPLE I

A pile of larch bark was thoroughly wet down with a water hose and allowed to stand and ferment for about one week. A 728 g. portion of the wet, fermented larch bark thus obtained (728 g., contained 49% water) was mixed and extracted with a 5 percent aqueous tannin liquor for 6 hours. A total of 2777 ml. of this tannin liquor extractant was used by circulating the extractant over and through the flood bark at a rate of 2040 ml./hour. The containing vessel required 1850 ml. of the tannin liquor to flood the bark in the vessel. After this extraction, the maltol-containing aqueous tannin liquor was drained off the wet bark and air was blown through the wet bark at 8 p.s.i.g. for 10 mintues to remove additional maltol-containing tannin liquor, the maltol-containing tannin liquor was contacted with chloroform in a disc agitator counter-current liquid-liquid contact apparatus in which the maltol-containing aqueous tannin liquor flowed up and chloroform flowed down at a rate of about 2040 ml./hour with the disc agitator rotating at about 600 r.p.m. The maltol content of the extracting tannin liquor which was treated with chloroform was 1.20 g. (colorimetrically determined) which is 0.32 percent based on the dark bark. The bark had been previously assayed and found to contain 0.047 g. of the maltol in 28 g. of wet bark containing 50 percent water (0.34% maltol). This aqueous tannin liquor extraction step was thus 94 percent effective in extracting maltol from the bark. At this stage the park contained 70 percent moisture. Most of this liquor may be pressed out for recycle so as to achieve a desirable higher equilibrium tannin concentration.

The maltol-containing chloroform from the aqueous tannin liquor/solvent extraction step was then concentrated by distillation of chloroform to a concentrate containing about 25 percent by weight of maltol. We have a 79 fold increase in concentration of maltol over the 0.32% concentration in the bark. This maltol rich concentrate was then purified by codistilling maltol with a diethylene glycol, followed by crystallizing the maltol residue from water and ethanol. The melting point of the maltol obtained was 163–164° C.

EXAMPLE II

This example illustrates the surprisingly greater effectiveness of the aqueous tannin liquor from previous extractions for maltol than water as a maltol extractant from the bark.

A vessel containing 28 g. of the fermented larch bark containing 50 percent water (14 grams) was flooded with 10 ml. of 15 percent aqueous tannin liquor at 70°–80° C. for 1.5 hrs. The tannin liquor was drained off the bark and analyzed for maltol. The liquor contained 0.41 g. of maltol per liter. The total volume of liquor (114 g.) used in this extraction contained 0.047 g. of maltol which is 100% of the amount of maltol present in the bark.

A similar 28 g. sample of the same fermented bark containing 50% water (14 g.) was flooded with 100 ml. of water at the same temperature (70°–80° C.) and for the same time (1.5 hrs.). The aqueous liquor was drained from the bark and analyzed for moltol as described above. The drained aqueous liquor contained only 0.25 g. of maltol per liter of liquor which is equivalent to 0.028 g. of maltol in the total water phase (114 g.) which amounted to only 60 percent of the available maltol in the bark.

These data show that the tannin liquor had an appreciably greater affinity for maltol than did the pure water, which is also a solvent for moltol.

The embodiments of this invention in which an exclusive property or privilege is claimed are defined as follows:

1. A process for obtaining maltol from maltol-containing tree bark which comprises (a) contacting the maltol-containing tree bark with an aqueous tannin liquor obtained from previous bark extractions to form a maltol-containing aqueous tannin liquor, and (b) recovering the maltol from the maltol-containing aqueous tannin liquor.

2. A process as described in claim 1 wherein the maltol-containing bark is finely divided.

3. A process as described in claim 1 wherein the maltol containing bark is wet with water and allowed to set for several days before contacting the bark with the aqueous tannin liquor.

4. A process as described in claim 1 wherein the aqueous tannin liquor contains a small amount of a mineral acid.

5. A process as described in claim 2 in which the finely divided bark is wet with water and is allowed to set in a pile in atmospheric conditions for at least 3 days before contacting the bark with the aqueous tannin liquor.

6. A process as described in claim 1 in which the aqueous tannin liquor used to extract the bark contains from about 2 percent to about 20 percent by weight of dispersed tannins based on the weight of the aqueous tannin liquor.

7. A process as described in claim 1 wherein the maltol-containing aqueous tannin liquor is treated with chloroform to remove the maltol.

8. A process as described in claim 1 wherein the bark remaining after contacting with the aqueous tannin liquor is pressed to recover a concentrated maltol-containing aqueous tannin liquor which is added to the maltol-containing aqueous tannin liquor.

9. A cyclic integrated process for obtaining maltol from maltol-containing tree bark which comprises (a) wetting, with water, finely divided maltol-containing tree bark and allowing the wet bark to set for several days, (b) contacting the resulting bark with an aqueous tannin liquor containing from about 2 percent to about 20 percent by weight of dispersed tannin therein to form maltol-containing aqueous tannin liquor, (c) contacting the maltol-containing aqueous tannin liquor with chloroform to form maltol-containing chloroform, (d) separating the resulting aqueous tannin liquor from the maltol-containing chloroform, (e) adjusting the volume and concentration of the resulting aqueous tannin liquor to from about 2 percent to about 20 percent by weight of dispersed tannins, (f) and re-using the resulting aqueous tannin liquor to extract maltol from bark as in step (b) above.

10. In a process for obtaining maltol from maltol-containing tree bark, the improvement which comprises (a) wetting finely divided maltol-containing bark with water and allowing the wet bark to set for several days, and (b) contacting the resulting bark with an aqueous tannin liquor containing from about 2 percent to about 20 percent of dispersed tannins by weight of the liquor, (c) separating the maltol-containing aqueous tannin liquor from the bark, and (d) removing the maltol from the aqueous tannin liquor by treating the liquor with chloroform.

11. A process for obtaining maltol from maltol-containing tree bark which comprises (a) contacting the maltol-containing tree bark with sufficient aqueous tannin liquor to saturate the bark, and (b) pressing the saturated bark until at least a major proportion of the maltol content of the bark is removed into the aqueous tannin liquor, and (c) recovering the maltol from the malto-containing aqueous tannin liquor.

12. A process as described in claim 11 wherein the aqueous tannin liquor is present in the saturated bark to an amount of from about 50 to about 80% by weight.

13. A process as described in claim 11 wherein the saturated bark is pressed until the aqueous tannin liquor is present in the resulting bark in an amount of from about 5 to about 45% by weight.

14. A process as described in claim 11 wherein the maltol-containing bark is finely divided.

15. A process as described in claim 14 in which the finely divided bark is wet with water and is allowed to set in a pile in atmospheric air for at least 3 days before contacting the bark with the aqueous tannin liquor.

16. A process as described in claim 11 wherein the maltol-containing bark is wet with water and allowed to set for several days before contacting the bark with the aqueous tannin liquor.

17. A process as described in claim 11 wherein the aqueous tannin liquor contains a small amount of a mineral acid.

18. A process as described in claim 11 wherein the maltol-containing aqueous tannin liquor is treated with chloroform to recover the maltol from the maltol-containing aqueous tannin liquor.

19. A cyclic integrated process for obtaining maltol from maltol-containing tree bark which comprises (a) wetting, with water, finely divided maltol-containing tree bark and allowing the wet bark to set for several days, (b) contacting the resulting bark with sufficient aqueous tannin liquor to saturate the bark, (c) pressing the saturated bark to form maltol-containing aqueous tannin liquor, (d) contacting the maltol-containing aqueous tannin liquor with chloroform to form maltol-containing chloroform, (e) separating the resulting aqueous tannin liquor from the maltol-containing chloroform, and (f) re-using the resulting aqueous tannin liquor in contacting bark as in step (b) above.

References Cited

UNITED STATES PATENTS 3,171,842   3/1965   Tate _____ 260—345.9

OTHER REFERENCES

Chem. Abstracts, vol. 58 (1963), p. 2565.

NORMA S. MILESTONE, Primary Examiner